United States Patent [19]

Clegg

[11] Patent Number: 4,575,197

[45] Date of Patent: Mar. 11, 1986

[54] CONICAL BEAM CONCENTRATOR

[76] Inventor: John E. Clegg, 2320 Keystone Dr., Orlando, Fla. 32806

[21] Appl. No.: 674,376

[22] Filed: Nov. 23, 1984

[51] Int. Cl.⁴ .................. G02B 13/18; G02B 17/00
[52] U.S. Cl. ................................. 350/432; 350/445
[58] Field of Search ......................... 350/432, 445

[56] References Cited

U.S. PATENT DOCUMENTS

| | | | |
|---|---|---|---|
| 2,881,654 | 4/1959 | Toffolo | 350/432 |
| 2,882,784 | 4/1959 | Toffolo | 350/432 |
| 4,277,148 | 7/1981 | Clegg | 350/432 |
| 4,325,612 | 4/1982 | Clegg | 350/432 |
| 4,333,713 | 6/1982 | Clagg | 350/432 |

Primary Examiner—John K. Corbin
Assistant Examiner—Scott J. Sugarman

[57] ABSTRACT

An upper component lens which receives and refracts a convergent conical beam of diffused sunlight, forming a convergent lateral beam in the horizontal plane; a middle component lens which refracts and reflects the beam, forming a divergent conical beam; and a lower component lens which refracts and emits the beam, forming a concentrated annular spectral beam.

1 Claim, 2 Drawing Figures

CONICAL BEAM CONCENTRATOR

BACKGROUND

Prior art is limited to beam concentrators which receive and emit beams which are parallel to the vertical optic axis of the lenses and which are nonspectral.

The code designation of the conical beam concentrator is TR-LRT-RT:CS (T—transmitting section of a component lens, R—refracting section of a component lens, L—reflecting section of a component lens, C—concentrating stage lens, and S—spectral).

DRAWINGS

DESCRIPTION

Figure 1:
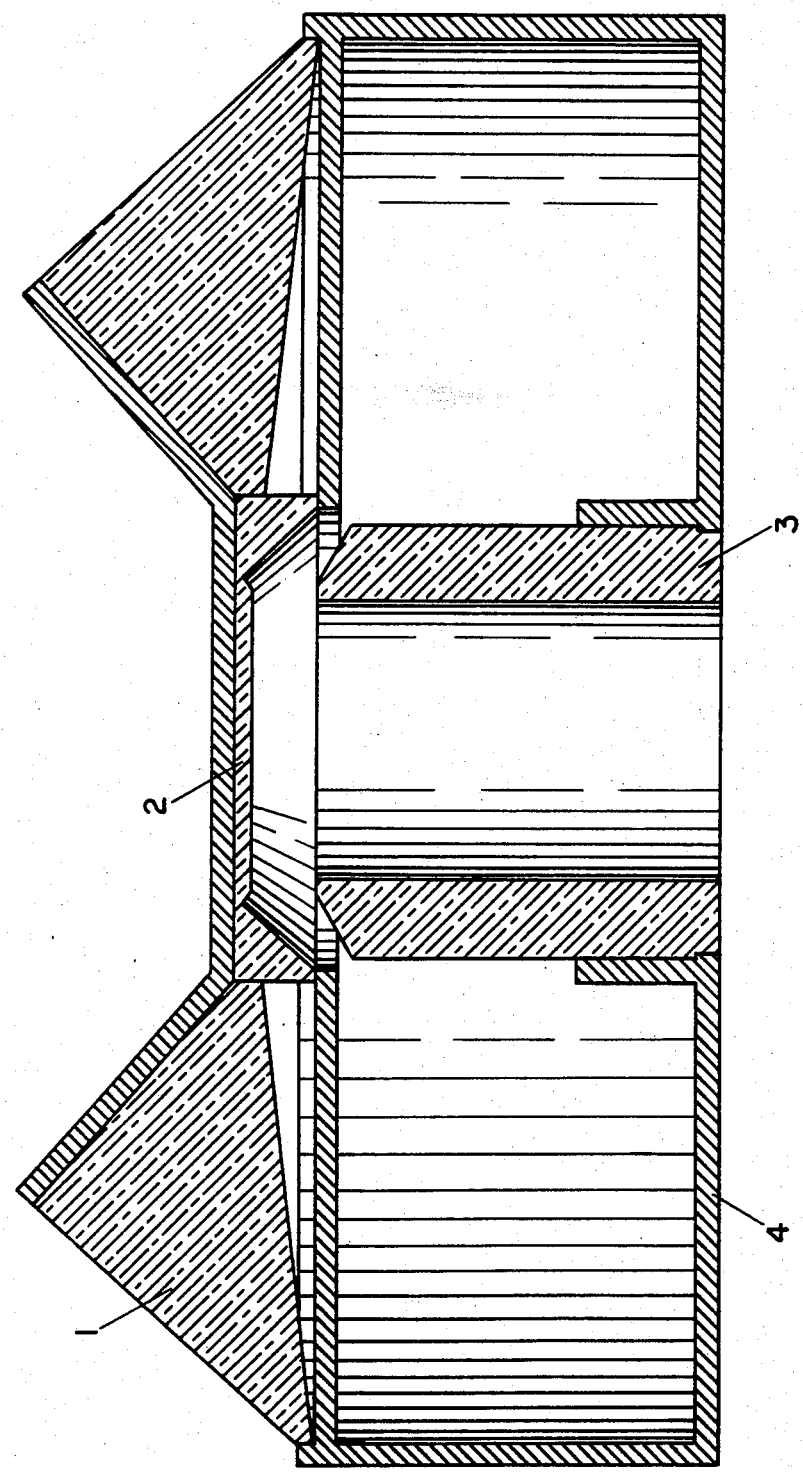
FIG. 1 is an elevation of the conical beam concentrator with the lenses shown in section.

FIG. 1 shows the conical beam concentrator TR-LRT-RT:CS with upper component lens RT 1, middle component lens LRT 2 and lower component lens TR 3 mounted inside casing 4.

Figure 2:
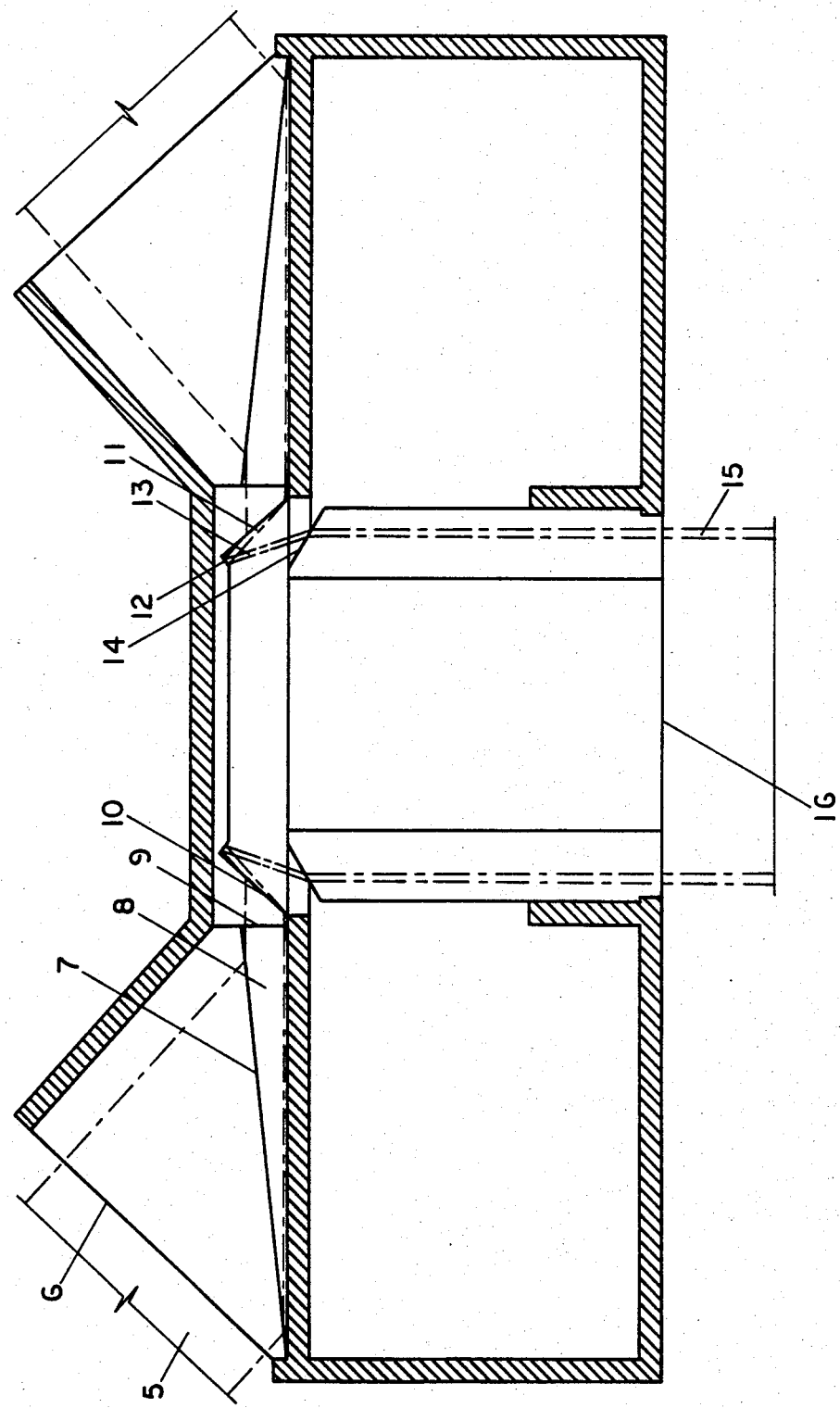
FIG. 2 is an elevation of the concentrator with a ray diagram.

FIG. 2 shows the conical beam concentrator with a ray diagram. Convergent conical beam 5 of diffused sunlight is received and transmitted by convex conical section 6 and refracted by concave conical section 7, forming convergent lateral beam 8 occupying the horizontal plane.

Beam 8 is transmitted by cylindrical section 9 and refracted by concave conical section 10, forming convergent conical beam 11 which is reflected by convex conical reflective section 12, forming divergent conical beam 13.

Beam 13 is refracted by convex conical section 14, forming concentrated annular spectral beam 15 which is emitted by planar section 16.

I claim:

1. A conical beam concentrator TR-LRT-RT:CS comprising:
    a. an upper component lens RT (1) with a convex conical section (6) and a concave conical section (7),
    b. a middle component lens LRT (2) with a cylindrical section (9), a concave conical section (10) and a convex conical reflective section (12), and
    c. a lower component lens TR (3) with a convex conical section (14) and a planar section (16).

* * * * *